United States Patent [19]

Conlon

[11] Patent Number: 5,051,987

[45] Date of Patent: Sep. 24, 1991

[54] INFORMATION TRANSMISSION NETWORK INCLUDING A PLURALITY OF NODES INTERCONNECTED BY LINKS AND METHODS FOR THE TRANSMISSION OF INFORMATION THROUGH A NETWORK INCLUDING A PLURALITY OF NODES INTERCONNECTED BY LINKS

[75] Inventor: Tom E. Conlon, Reading, England

[73] Assignee: Racal-Milgo Limited, Bracknell, England

[21] Appl. No.: 381,269

[22] Filed: Jul. 18, 1989

[30] Foreign Application Priority Data

Jul. 20, 1988 [GB] United Kingdom ............... 8817288

[51] Int. Cl.⁵ .............................................. H04J 3/24
[52] U.S. Cl. ..................................... 370/94.1; 370/60
[58] Field of Search ...................... 370/60, 94, 85, 86

[56] References Cited

U.S. PATENT DOCUMENTS

| | | | |
|---|---|---|---|
| 4,320,500 | 3/1982 | Barberis et al. | 370/94 |
| 4,380,063 | 4/1983 | Janson et al. | 370/60 |
| 4,443,875 | 4/1984 | Blausten | 370/60 |
| 4,466,060 | 8/1984 | Riddle | 364/200 |
| 4,747,100 | 5/1988 | Roach et al. | 370/86 |
| 4,771,424 | 9/1988 | Suzuki et al. | 370/86 |
| 4,825,206 | 4/1989 | Brice, Jr. et al. | 340/827 |

FOREIGN PATENT DOCUMENTS 0113272 11/1984 European Pat. Off. .
8502737 6/1985 PCT Int'l Appl. .
2176972 1/1987 United Kingdom .

OTHER PUBLICATIONS

Publication, "Applications of AI Techniques to Adaptive Routing in Wide Area Networks", Ashany et al. IEEE Transactions on Computers, vol. C-28, No. 8, Aug. 1979, New York, U.S. pp. 567-572: E. E. Schwartzlander et al., "A Routing Algorithm for Signal Processing Networks".

IEEE Global Telecommunications Conference 1987 Nov. 1987 New York, U.S., pp. 193-198, R. Kung et al., "A Distributed Algorithm for Reliable Message Delivery Over a Sub-Network".

Primary Examiner—Douglas W. Olms
Assistant Examiner—Min Jung
Attorney, Agent, or Firm—Levdig, Voit & Mayer

[57] ABSTRACT

A data transmission network comprises a plurality of interconnected nodes and input/output units. In response to receipt of a data message for onward transmission through the network, each node accesses information which it stores relating to the then current topology of the network and transmits the message through the appropriate connecting links. Each node operates according to a predetermined algorithm to up-date its stored topology information. Each node at any given time assumes a particular state, state n. When in this state, it interrogates immediately each neighboring node with the question "Who are the neighbors of node of distance (n−1) from you?" where "distance" is defined in terms of the number of links. The addressed nodes respond either by returning the requested information in the form of a positive reply or by responding "Don't yet know". Each node advances to state (n+1) after it has received a consistent set of positive replies from all its neighbors and then repeats the question, again to each of its immediate neighbors but now concerning the identities of the next more distant nodes. The information received as it advances through the states is stored and thus up-dates the topology information.

6 Claims, 3 Drawing Sheets

INFORMATION TRANSMISSION NETWORK INCLUDING A PLURALITY OF NODES INTERCONNECTED BY LINKS AND METHODS FOR THE TRANSMISSION OF INFORMATION THROUGH A NETWORK INCLUDING A PLURALITY OF NODES INTERCONNECTED BY LINKS

BACKGROUND OF THE INVENTION

The invention relates to information communication networks and methods and, in particular, to networks comprising a plurality of nodes at each of which is situated an information handling unit connected, by a plurality of communication connections, to one or more other nodes and/or input/output devices. Information is accordingly received from time to time by each node, for onward transmission to a particular destination which may be another node or an input/output device connected thereto for example. The node initially receiving the information therefore has to choose the route along which to transmit the information to its ultimate destination, taking into account the then current state of the network and thus taking into account dynamic changes in the network which will occur from time to time.

SUMMARY OF THE INVENTION

According to the invention, there is provided an information transmission network, including a plurality of nodes interconnected by links and at least some of which are also connected to input/output units, each node including means responsive to an information message received whereby to arrange for the transfer of the information message, through the network, to another node in the network, each node including means storing information concerning the topology of the network and its interconnections, means responsive to the stored information to determine a route for the information message through the network, and updating means for maintaining the stored topology information and to take account of dynamic changes in the topology of the network, the up-dating means including means for automatically and repeatedly establishing the identities of the progressively more distant nodes.

According to the invention, there is also provided a method of transmitting information within a network comprising a plurality of nodes, interconnected by links, the method comprising the steps, in each node, of storing information there relating to the topology of the network, responding to an information message to be transmitted to another destination via the network by accessing the stored information and routing the message to that destination in dependence on the accessed information, and up-dating the stored information to take account of dynamic changes in the topology of the network, the up-dating step comprising for each node the sub-steps of interrogating each of its immediately neighbouring nodes to establish, in turn, their identities and the identities of the progressively more distant neighbours, and storing the identities so established and up-dating the stored information in dependence thereon.

DESCRIPTION OF THE DRAWINGS

An information transmission network embodying the invention will now be described, by way of example only, with reference to the accompanying drawings in which.

DESCRIPTION OF PREFERRED EMBODIMENTS

Figure 1:
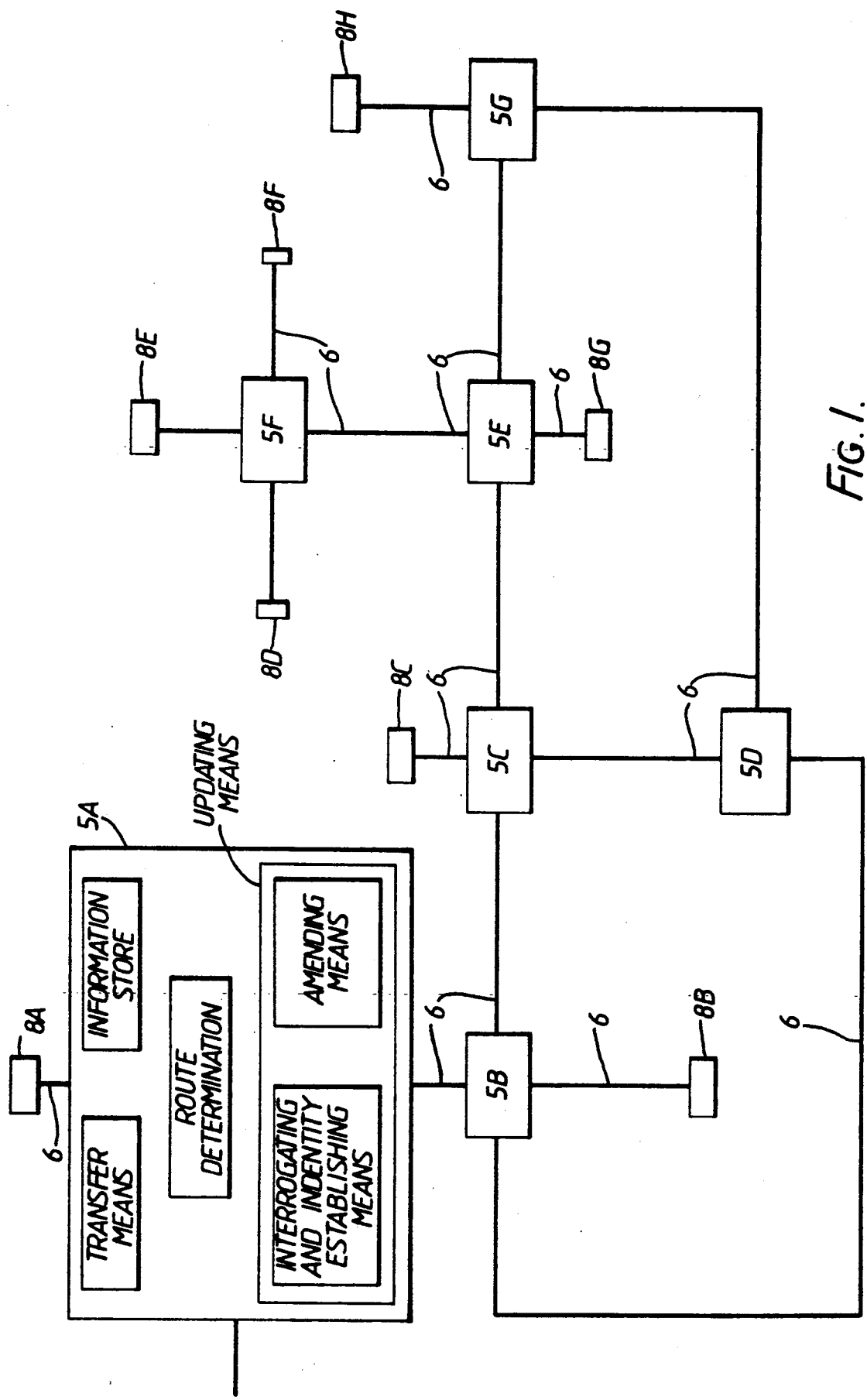
FIG. 1 is a schematic diagram of the network.

As shown in FIG. 1, the network comprises nodes 5A, 5B, 5C, 5D, 5E, 5F and 5G which are interconnected by means of communication links 6. The nodes are also connected to input/output devices, some of which are shown at 8A, 6B, 8C, 8D, 8E, 8F, 8G and 8H. The network illustrated is of course merely by way of example. Each node 5A-5G comprises suitable data processing hardware. The node referenced 5A is shown in detail to illustrated the different functions performed by the node. The other nodes 5B to 5G are identical, but are shown in less detail. When it receives a data message, for example from an input/output unit connected to it, it responds by setting up a data transmission path via the communication links 6, for sending the data message to its intended destination. For example, node 5A may receive a data message from input/output unit 8A which is intended for transmission to input/output unit 8H. This data message could be sent by a variety of different ways. For example, it could be transmitted via nodes 5B, 5C, and 5E. Instead, however, it could be transmitted via nodes 5B and 5D, thus bypassing nodes 5C and 5E. A further possible path is via nodes 5B, 5C and 5D, thus bypassing node 5E. Node 5A has to decide the transmission path according to the then current state of the network. The state of the network will be dynamically changing. For example, there may be a failure of one or more connecting links, and nodes and connecting links may be added or taken out of service. In a manner to be described, therefore, each node includes means continuously operating in accordance with a predetermined algorithm, for up-dating its awareness of the state of the network. In this way, therefore, it is able to respond to each data message received by sending it to its intended destination along the optimum route.

The algorithm will now be described.

An interrogation protocol operates between the nodes, using a switching channel in the data links. The intention is that the protocol should serve as the mechanism both for automatically coping with disruption of the network while it is running and for the initial setting up of the control topology when the network is first brought up.

The algorithm operates on the assumption that the links between neighbouring nodes either transmit a message reliably or will provide an indication of link failure.

Each node has its own predetermined identity (e.g. a number) which, in general, is unchanging. In accordance with the algorithm, each node has at any given time a particular "information state", that is a state representing its current knowledge of the topology of the network. Initially, each node assumes "State 0" and then progresses from State 0 to State 1, State 2 and so on as its knowledge of the topology progresses across the network. Each node progresses from one state to the next by asking questions of its immediate neighbours. The State 0 question of the algorithm is "Who are you?". By means of this question, the node obtains the identities of its immediate neighbours. For n 0, the State n question is "Who are the neighbours of nodes of distance (n−1) from you?" Distances are defined in terms of the number of links. Thus, if n=1, the question asks to each immediately neighbouring node "Who your neighbours?". If n=2, the question asks each immediately neighbouring node "Who are the neighbours of your neighbours?".

When a node receives a State n question it either returns the requested information, that is, a list of the identities of immediate neighbours of each node at distance n−1 (this is called a positive reply), or it returns a "Don't yet know" reply. The form of the positive reply is such that the node receiving it can discover from it the immediate neighbours of each node at distance n−1 from the node that sent the positive reply. This can be done by, for example, preceding each list of neighbours in the positive reply with the identity of the node (at distance n−1) that they neighbour.

On initialisation each node is in State 0. A node in State n advances to State (n+1) after it has received a consistent set of positive replies to the State n question from all its neighbours. Each node stores the information it receives as it advances through the states. Each node seeks to advance its state until an advance in state is made without the discovery of any more nodes; when this happens the node stops asking questions.

If a node X in State r receives a State n question, its behaviour depends on the value of r : if r<n, X returns a "Don't yet know"; if r=n or r=(n+1), then X returns the requested information which is extracted from the information which it has previously stored in its advance to its present state (see Proposition 1 below); if r<(n+1), X returns the requested information and X reverts to State (n+1) and discards information obtained in advances beyond State (n+1).

If a node X detects that a link to a neighbour Y has gone down, or that the neighbour Y has itself gone down, then X will revert to State 0 and discard all information except its own identity. The failure of a link between X and Y will be detected by both X and Y and hence both nodes will revert to State 0.

After a node receives a "Don't yet know" reply to a State n question it waits to resend the question until it receives a State n question from the adjacent node or until a timer has expired and then resends the question. This question will be received when the adjacent node reaches State n and hence can answer State n questions. If a node receives information which is inconsistent with what it has currently stored, it reverts to the beginning or its current state and waits for a neighbouring node to change state (detected by the neighbouring node asking it a question) before repeating its state n questions.

Figure 2A:
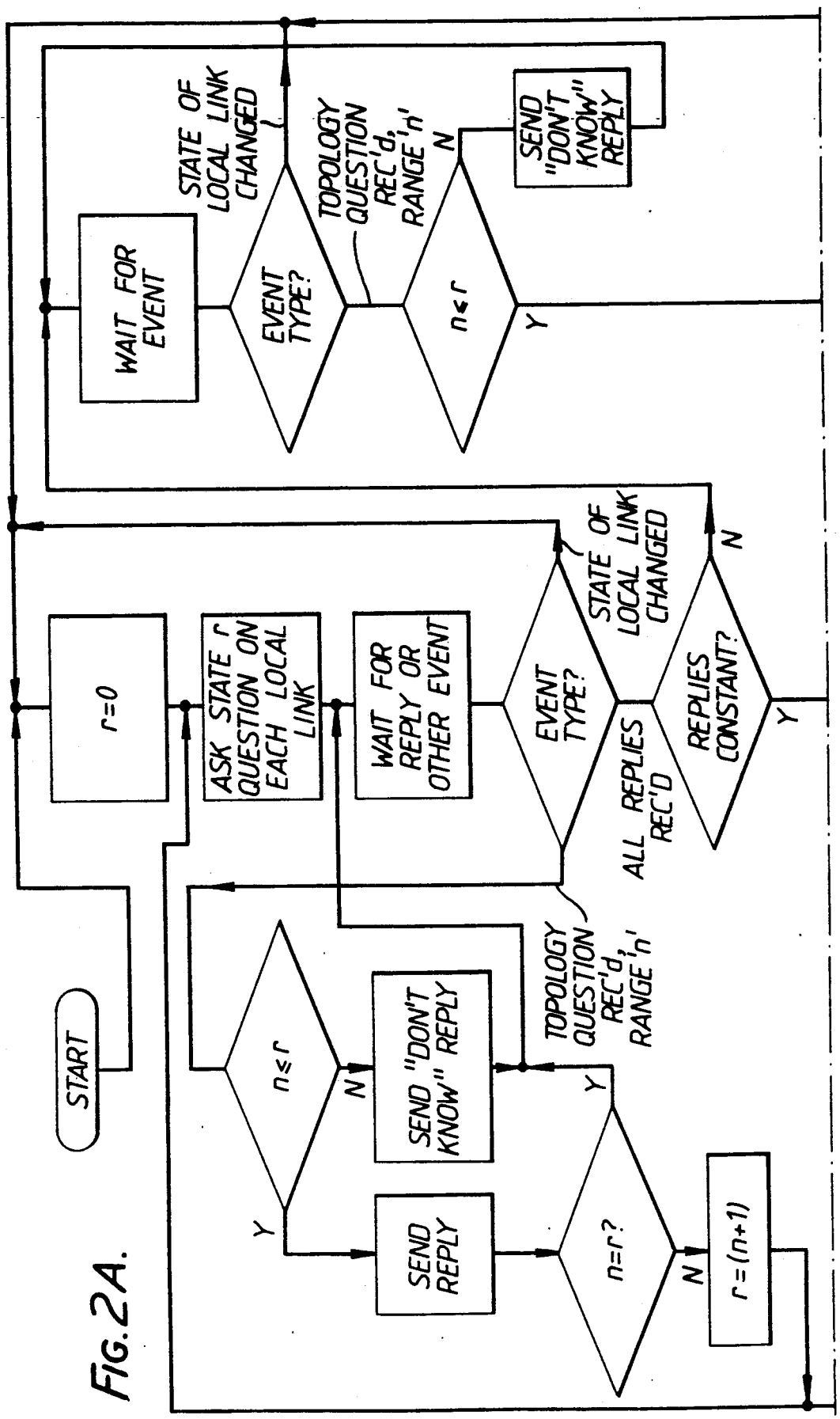
FIG. 2 is a flow chart.
Figure 2B:
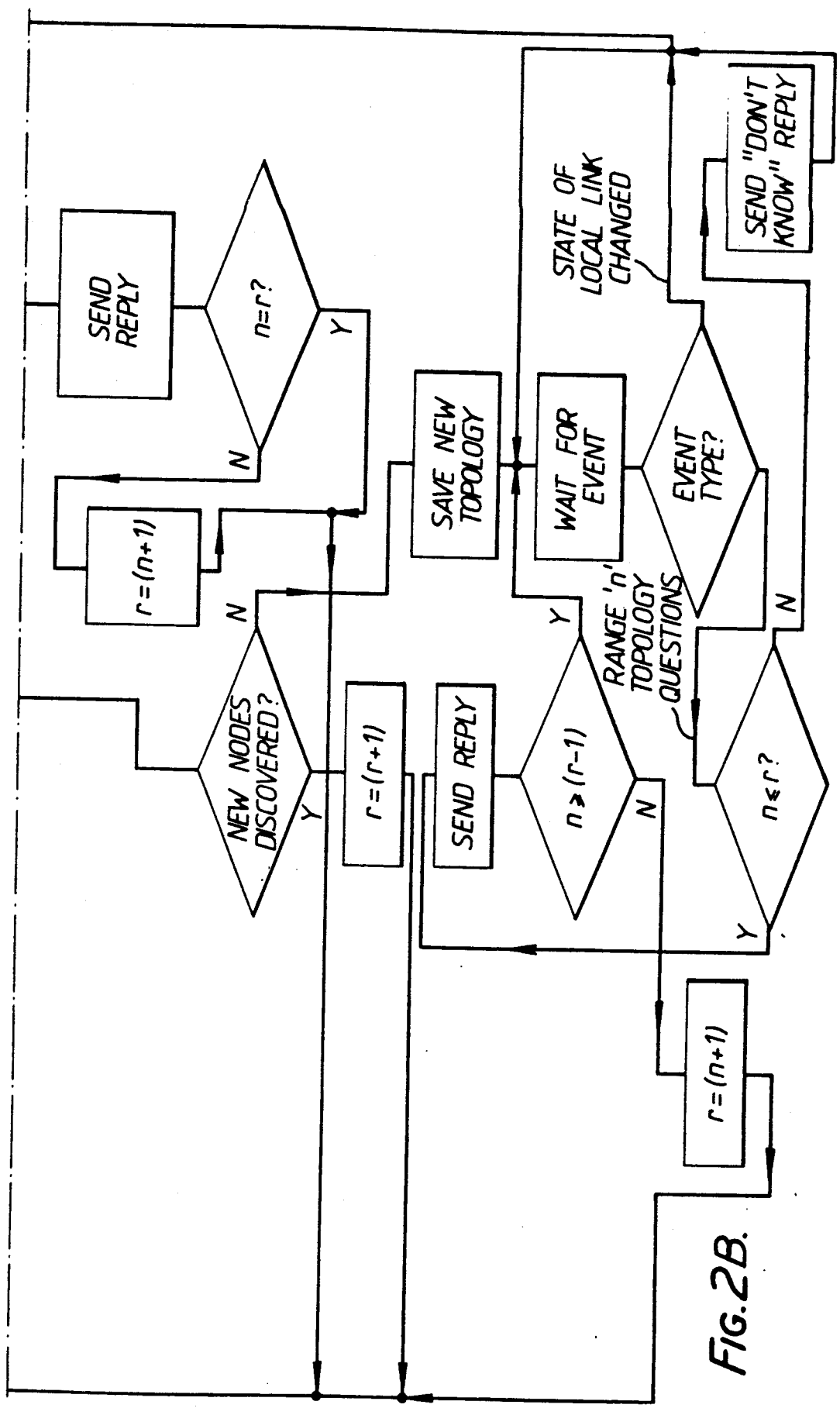

The above-described algorithm is illustrated in the flow chart of FIG. 2 and its integrity is explained in detail below. The flow chart ignores the need to repeat topology questions when a "don't know" reply is received.

(a) Proposition 1

A node X in State (n+1) knows:
(a) the identity of all nodes of distance <(n+2) from X;
(b) the identity of all links joining nodes of distance n from X to nodes of distance <(n+1) from X;
(c) the complete topology for the subgraph of nodes which are of distance (n+1) from X.

Proof

The proof is by induction on the state.

The proposition is obviously true for the case n=0.

Assume the proposition is true for all nodes in States <(n+1). We want to prove the proposition for State (n+1). X gets into State n+1 by receiving positive replies from each of its neighbours to the State n question "Who are the neighbours of nodes of distance (n−1) from you? ". A neighbour Y will attempt to answer the question positively if it is in State n or higher. The induction hypothesis is applied to Y in State n. A neighbour of a node of distance (n−1) from Y is either at distance n from Y, in which case clause (b) of the induction hypothesis above applies, or it is at distance <n, in which case clause (c) applies. If Y is in state n it can therefore answer the question from stored information and if it is in a higher state it can do it a fortiori Let Z be a node at distance (n+1) from X. Then Z is at distance n from some neighbour of X, say W. Then Z is a neighbour of some node of distance (n−1) from W. Therefore the identity of Z is returned in the State n question from X to W. This proves clause (a).

Let L be a link joining a node Z1 at distance n from X to a node Z2 at distance (n−1) from X. Then Z1 is at distance n−1 from some neighbour of X, say W. Therefore the link L is returned to X in the State n question to W.

This proves clause (b).

Let Z1 and Z2 be nodes which are neighbours and both of which are of distance <(n+1) from X. By induction hypothesis, X knows the identity of Z1 and Z2. To complete the proof we need to show that X knows about the link from Z1 to Z2. Let us use d(A B) to mean the distance between the nodes A and B. If d(Z1 X)<n and d(Z2 X)<n, then by induction hypothesis the link from Z1 to Z2 was already known by X in State n. If d(Z1 X)=n then d(Z2 X)=n or d(Z2 X)=(n−1). If d(Z2 X)=(n−1), then the link between Z1 and Z2 was returned by a State (n−1) question, since, for some neighbour of X, say W, d(Z2 W) (n−2) and the Slate (n−1) question to W would return the link. If d(Z2 X)=n, then for some neighbour of X, say W, d(Z2 W)=(n−1) and the link was returned to X by the State n question to W.

(b) Proposition 2

Every node not in state infinity can increase its state.

Proof

Let X be a node in state n issuing State n questions. From Proposition 1 it follows that a neighbour of X can positively reply to X if it is in State n or higher. Therefore if X cannot get to State (n+1), it must be because some neighbour, W, cannot get to State n.

Repeating the argument, W cannot get to State n because some neighbour of W cannot get to State n−1. Therefore some node cannot get to State 1 which is impossible.

(c) Proposition 3

If a node in State n discovers no more nodes in advancing its state to (n+1), then the node knows the entire topology of the connected subnetwork containing it.

Proof

Let X be a node. If the set of nodes at distance <(n+1) from X and the set of nodes at distance <(n+2) from X coincide, then the set contains all the nodes, for if there were a node at distance (n+2), there would be a node at distance (n+1) and the sets would not coincide. The proposition then follows from proposition 1.

(d) Proposition 4

Following a change of link status between neighbours, every node recalculates the new correct topology.

Proof

Assume the status of the link between neighbours X and Y changes.

The first part of the proof is to show that, following the change in link status, each node will eventually get to a state from which it will never revert to a lower state and in which it holds the new correct information about the XY link. The proof of this is by induction on the distance from Y and X.

The inductive hypothesis is that all nodes of distance r from Y and at least distance r from X revert to State r and therafter they advance their state to State (r+1) from which they do not subsequently revert and in State (r+1) they know the new correct information about the XY link.

For nodes of distance 0 from Y (i.e. Y itself) the induction hypothesis is obviously true.

Let Z be of distance n from Y and at least distance n from X.

Assume there are m distinct shortest paths of length n from either X or Y to Z and that Ai ... Am are the neighbours of Z on each of these paths so that each Ai is at distance (n−1) from X or Y. At some point, Z will revert to State n in consequence of State (n−1) messages from the Ai. Let Aj be the first of the Ai to send a State (n−1) message to Z causing it to revert to State n. In State n, Z does not know whether there is a link from X to Y or not. Z cannot get into State (n+1) before Aj gets to state n. By inductive assumption Aj can advance to State n and in State n it holds the (new) correct information about the XY link. When Aj gets to State n it is possible that some of the other Ai are still in State infinity and are thus still holding the old incorrect information about the XY link. In this case Z's attempts to get to State (n+1) will be frustrated by inconsistent information about the XY link. Therefore Z can only get to State (n+1) when all the Ai have reached State n and in State (n+1) Z will hold the correct information about the XY link. As the other neighbours of Z do not return information about the XY link on the State n question, they do not affect Z's ability to get to State (n+1). Once Z is in State (n+1) it does not revert to State n again because it has already received all possible messages which cause reversion to State n as a result of the loss of the link XY. This completes the induction.

The advance of Z to complete the topology from State (n+1) can only be frustrated because it receives incorrect information about the XY link from some other node W. However, by the above argument, this frustration will be only temporary as W will sooner or later receive the correct information about XY.

(e) Proposition 5

Following any change in topology, a node recalculates the correct topology of the connected subnetwork containing the node.

Notation

In the proof of this proposition and its associated lemmas, the following notation is used:

| | |
|---|---|
| State (X.t.) | the state of node X at time t. |
| d(X,Y) | the distance between X and Y along the shortest path | between them.

Lemma 1

For all finite r, any node X shall revert to states <r at most a finite number of times as a result of a topology change.

Proof

The proof is by induction on r. The induction hypothesis is that for some r, for all nodes A, and for all 1<r, A reverts to States <l at most a finite number of times.

For r=0, no node ever reverts to States <0, hence no node reverts to states <0 more than a finite number of times. The induction hypothesis is hence true for r=0.

Assume that the induction hypothesis is true for r=n. Consider a node X. X shall revert to a State 0<m<n only when a neighbour reverts to State (m−1). By the induction hypothesis, this occurs at most a finite number of times. X shall revert to State 0 only when a link terminated at X changes state. But a topology change changes the state of at most a finite number of links. Therefore X shall revert to States <n at most a finite number of times. But this is true for all nodes X. Hence the induction hypothesis is true for r=n+1. Hence, by induction, it is true for all r.

Lemma 2

If X and Y are neighbours, PQ is a link such that at some time T State (X,T)<d(P,X), State (Y,T)<d (P,X)+1, and d(Q,X)<=d(P,X) then X and Y have identical knowledge of the state of PQ.

Proof

X receives information about the state of PQ when it is in state d(P,X).

Y receives information about the state of PQ when it asks X a State d(P,X)+1 question.

For Y to have reached a State<d(P,X)+1, it must have passed through State d(P,X)+1. It hence must have asked X a d(P,X)+1 question and have received an answer from X.

X's knowledge of the state of the link can only change when X asks its neighbours an d(P,X) question. But this will have caused Y to revert to State d(P,X)+1 (unless it is already in this state or lower). Y can only reach a higher state after asking X an d(P,X) +1 question. X will only answer this question once it has reached state d(P,X)+1 by which time it will have updated its knowledge of the link between P and Q. Hence when Y reaches a state <d(P,X)+1, its knowledge of the state of the link between P and Q will be identical to X's knowledge of the state of the link when X reaches state d(P,X).

Lemma 3

For all r any node with incorrect knowledge of a link terminating a distance r from it shall pass through a State<(r+1).

Proof

The proof shall be by induction on r. The induction hypothesis is:

For some r any node with incorrect knowledge of a link at a distance r from it shall pass through a State<(r+1).

The hypothesis is clearly true for r=0

Assume it is true for all nodes for r=n. Assume also that X has incorrect knowledge of a link terminating at P at a distance (n+1) from X. It will now be proved that after finite time, state (X)<(n+2). If State (X)<(n+2) there is nothing to prove, so assume State $(X) >= n+2$. Then X has a neighbour Y at a distance n from P. If State $(Y) < (n+1)$ then after finite time State $(X) <= $ State $(Y) < +1 < (n+2)$. If state $(Y) <= (n+1)$ then by Lemma 2, Y's knowledge of the state of the link is identical to X's knowledge of the state of the link. Hence Y's knowledge of the state of the link is incorrect. Hence, from the induction hypothesis, after finite time state (Y) $(n+1)$. Hence after finite time state $(X) < (n+2)$. But this is true for all nodes X. Hence for $r=(n+1)$ the induction hypothesis is true.

Hence the induction hypothesis is true for $r=0$ and if it is true for $r=n$ it is true for $r=(n+1)$. Hence it is true for all r.

Lemma 4

The state of every node in a finite state shall increase in a finite time.

Proof

By induction on the State r of the nodes.

The induction hypothesis is that for some r, every node in state $<r$ shall increase above r in finite time.

The induction hypothesis is clearly true for $r=0$.

Assume it is true for $r-n$.

Let X be any node in State $(n+1)$. It will first be shown that there exists a time T such that for times $t>T$ and for all neighbours Z of X, State $(Z)>n$ (the foregoing is referred to below as "requirement A"). Assume that there exists a Y that is a neighbour of X such that there exists a time $TO'(Y)$ such that state $(Y, TO'(Y)) <= n$. (If no such Y exists, requirement A is trivially true). By lemma 1, Y will only revert to states less than $(n+1)$ a finite number of times. Let $T'(Y)$ be the last time at which this occurs. By the induction hypothesis, there exists a time $T(Y) > T'(Y)$ such that State(Y, $T(Y)) > n$. Hence by the definition of $T'(Y)$, at all times $t>T(Y)$, state $(Y)>n$. Now let $T=\max [T(Z)Z$ is a neighbour of X]. Then for all $t>T$ and for all Z neighbours of X, State(Z,t)$>n$. Hence, requirement A is true.

If there are no contradictions between the information X receives in answer to its $(n+1)$ questions it will reach State $(n+2)$ a finite time after this time. If there is a contradiction, then at least one of its neighbours had incorrect information about a link at a distanc$<(n+1)$ from it. Hence by Lemma 3 this node will pass through a State $<(n+1)$ in finite time. But this is impossible because of requirement A. Hence there can be no contradictions in the information received by X after its neighbours have reached the state described in requirement A. Hence X reaches State $(n+2)$.

Hence if the induction hypothesis is true for $r=n$, it is true for $r=(n+1)$. But the induction hypothesis is true for $r=0$. Hence it is true for all r.

Proof of Proposition 5

By Lemma 4 every node in a finite state r shall reach State $(r+1)$ in finite time. By Lemma 1 it shall not revert to States$<(r+1)$ more than a finite number of times. Hence the node shall after a finite time reach State $(r+1)$ and shall not again revert to any State $<(r+1)$. But this is true for all finite r and the maximum number of nodes in the connected subnetwork is finite. Hence the node shall reach a state in which it does not detect any new nodes and shall not revert from this state. But when a node reaches this state it enters State infinity. Hence after a finite time, all nodes shall enter State infinity. But by Lemma 2 if all the nodes in a connected network are in State infinity they must all have identical maps of the network. Furthermore, all nodes in States $>0$ have correct maps of the links to their neighbours. Hence all nodes have correct maps of the links to the neighbour of any node. Hence all nodes have a correct map of every link.

What is claimed is:

1. An information transmission network, comprising a plurality of nodes interconnected by links and at least some of which are also connected to input/output units, each node including means responsive to an information message that has been received by the node, and is to be transmitted to another destination, and routing the received information message through the network, to said another destination, and each node being distinguishable from the other nodes in the network by a respective index that identifies the node, each node including means for storing information concerning the topology of the network and the interconnections of the plurality of nodes, means responsive to the stored information to determine the route for the information message through the network and updating means for maintaining the stored topology information and for updating the stored topology information in accordance with dynamic changes in the topology of the network, wherein each node has at any time a particular state dependent on the distance from it of the nodes whose indices it has successfully identified, and the updating means of each node including means for automatically and repeatedly identifying and indices of progressively more distant nodes by interrogating each of the immediately neighbouring nodes to identify the index of the immediately neighbouring node and the indices of nodes whose distance from said immediately neighbouring nodes is dependent on said state of the interrogating node.

2. A network according to claim 1, in which the identification of each node by an interrogating node includes establishment of a respective link by which the identified node is connected to the node next nearer to the interrogating node.

3. A method of transmitting information within a network comprising a plurality of nodes, interconnected by links, the method comprising the steps, in each node, of storing information in the node relating to the topology of the network, responding to an information message to be transmitted to another destination via the network by accessing the stored information and routing the message to said another destination in dependence on the accessed information, and updating the stored information in accordance with dynamic changes in the topology of the network, the updating step comprising for each node the sub-steps of interrogating each of its immediately neighbouring nodes to identify, in turn, indices representing said immediately neighbouring nodes and the indices representing progressively more distant neighbours, and storing the indices so established and updating the stored information in dependence thereon, and wherein for carrying out the updating step, each node has at any time a particular state dependent on the distance from it of the nodes whose indices it has successfully identified, each interrogating sub-step including interrogating the said immediately neighbouring nodes about nodes whose distance from the said immediately neighbouring nodes is dependent on said state of the interrogating node.

4. A method according to claim 3, in which the said state of a respective node is a numerical value dependent on the distance from that node, in terms of numbers of links, of other nodes that the respective node has successfully identified, whereby a node in State "0" interrogates the immediately neighbouring nodes, and a node in State "n" interrogates the immediately neighbouring nodes about nodes at distance (n−1) from the immediately neighbouring nodes.

5. A method according to claim 4, in which each said interrogated node, in a state r, responds to an interrogation from an interrogating node in State n in a manner dependent on the value of r, whereby, (a) if r is less than n, the response indicates an absence of knowledge of the answer to the question;

(b) if r=n or (n+1), the response is the requested information obtained from its said stored replies; and (c) if r is greater than (n+1), the response is the requested information and, in addition, the node reverts to state (n+1) and discards information obtained in advances beyond state (n+1), where r is an integer representing the state of the interrogated node, and n is an integer representing the state of the interrogating node.

6. A method according to claim 5, in which each of two neighbouring nodes responds to interruption of a link between them by each reverting to State 0 and each discarding all stored information except information about itself.

* * * * *